(12) United States Patent
McLellan

(10) Patent No.: US 10,378,733 B1
(45) Date of Patent: Aug. 13, 2019

(54) MODULAR OPTICAL ASSEMBLY AND LIGHT EMISSION SYSTEM

(71) Applicant: Race, LLC, Martinez, CA (US)

(72) Inventor: Brant C. McLellan, Phoenix, AZ (US)

( * ) Notice: Subject to any disclaimer, the term of this patent is extended or adjusted under 35 U.S.C. 154(b) by 0 days.

(21) Appl. No.: 15/798,244

(22) Filed: Oct. 30, 2017

Related U.S. Application Data

(63) Continuation-in-part of application No. 15/798,211, filed on Oct. 30, 2017.

(51) Int. Cl.
| | |
|---|---|
| *B60Q 1/00* | (2006.01) |
| *F21V 5/04* | (2006.01) |
| *F21V 7/00* | (2006.01) |
| *F21V 13/04* | (2006.01) |
| *F21V 17/00* | (2006.01) |
| *F21V 17/14* | (2006.01) |
| *F21V 29/70* | (2015.01) |

(52) U.S. Cl.
CPC .............. *F21V 17/002* (2013.01); *F21V 5/04* (2013.01); *F21V 7/00* (2013.01); *F21V 13/04* (2013.01); *F21V 17/14* (2013.01); *F21V 29/70* (2015.01); *B60Q 1/0064* (2013.01)

(58) Field of Classification Search
CPC ........ F21V 13/04; F21V 17/002; F21V 17/14; F21V 7/0083; F21V 5/007; B60Q 1/0064
USPC .................. 362/651, 327, 240, 237
See application file for complete search history.

(56) References Cited

U.S. PATENT DOCUMENTS

| | | | |
|---|---|---|---|
| 7,872,278 B2 | 1/2011 | Stoyan | |
| 7,976,335 B2 | 7/2011 | Weber et al. | |
| 8,033,687 B2 | 10/2011 | Wang et al. | |
| 8,240,887 B2 | 8/2012 | Daily et al. | |
| 8,684,569 B2 | 4/2014 | Pichard et al. | |
| 8,757,852 B2 | 6/2014 | Lopez et al. | |
| 8,770,806 B2 | 7/2014 | Koo et al. | |
| 8,801,217 B2 | 8/2014 | Oehle et al. | |
| 8,845,146 B2 | 9/2014 | Blankestijn et al. | |

(Continued)

FOREIGN PATENT DOCUMENTS

EP        2799766 A1     11/2014

OTHER PUBLICATIONS

KC Flex Array LED Light Bars—http://www.kchilites.com/light-type/led/flex-led/flex-array-led-light-bars.html.

(Continued)

*Primary Examiner* — William N Harris
(74) *Attorney, Agent, or Firm* — Perry S. Clegg; Kunzler Bean & Adamson, PC

(57) ABSTRACT

A light emission system includes fixture assembly including a chassis and a driver board. The Chassis includes a plurality of modular optical receptacles. The driver board is removably coupled to the chassis. The system further includes a plurality of modular optical assemblies each configured to removably couple to the fixture assembly at the modular optical receptacles. The modular optical assemblies include a lens unit including a reflector, a focusing lens, and an annular ridge between the reflector and the focusing lens. The modular optical assemblies further include a support ring including an annular ring, and a plurality of axial protrusions extending from the annular ring. The modular optical assemblies further include a bezel ring. The support ring is disposed between the bezel ring and the lens unit.

19 Claims, 9 Drawing Sheets

(56) References Cited

U.S. PATENT DOCUMENTS

| | | | |
|---|---|---|---|
| 9,010,977 B2 | 4/2015 | Harbers et al. | |
| 9,194,565 B2 | 11/2015 | Chen et al. | |
| 9,400,100 B2 | 7/2016 | Wronski | |
| 2008/0232106 A1* | 9/2008 | Brune | F21V 5/04 362/267 |
| 2010/0195323 A1* | 8/2010 | Schaefer | F21V 5/007 362/235 |
| 2010/0309660 A1* | 12/2010 | Lim | F21V 5/04 362/231 |
| 2011/0211351 A1 | 9/2011 | Van De Ven et al. | |
| 2012/0051065 A1* | 3/2012 | Daily | F21V 5/007 362/311.02 |
| 2012/0140437 A1* | 6/2012 | Kim | F21K 9/00 362/84 |
| 2012/0188766 A1* | 7/2012 | Lu | F21V 29/2212 362/249.02 |
| 2014/0140078 A1 | 5/2014 | Alfier et al. | |
| 2014/0311076 A1 | 10/2014 | Ishaque et al. | |
| 2015/0316229 A1* | 11/2015 | Jurik | F21V 5/007 362/237 |
| 2015/0362147 A1* | 12/2015 | Schouboe | F21V 5/007 362/237 |
| 2017/0122532 A1 | 5/2017 | Zhang | |

OTHER PUBLICATIONS

Rigid E-Series Pro 20" Driving—https://www.rigidindustries.com/led-lighting/121613.
Rigid Difference—https://www.rigidindustries.com/rigiddifference.
U.S. Appl. No. 15/798,211, Office Action Summary, dated Oct. 4, 2018.

* cited by examiner

MODULAR OPTICAL ASSEMBLY AND LIGHT EMISSION SYSTEM

CROSS REFERENCE TO RELATED APPLICATIONS

The present application claims the benefit under 35 U.S.C. § 119(e) of U.S. patent application Ser. No. 15/798,211 filed on Oct. 30, 2017, which is incorporated herein by reference in its entirety.

FIELD

This application relates generally to modular emitting devices. In particular, this application relates to mechanism for allowing quick replacement of lighting emitters without the replacement of its supporting electronics and housing.

BACKGROUND

Illumination requirements for moving machinery are often changing based on the environment and properties of the machinery itself. Automotive lights, and even more particularly, automotive lights for racing are subjected to damaging conditions. Replacement of components sometimes needs to be done quickly and efficiently without having to replace expensive components that are still functioning.

SUMMARY

The subject matter of the present application has been developed in response to the present state of the art, and in particular, in response to the problems and disadvantages associated with conventional lighting apparatuses that have not yet been fully solved by currently available techniques. Accordingly, the subject matter of the present application has been developed to provide embodiments of a system, an apparatus, and a method that overcome at least some of the shortcomings of prior art techniques.

Disclosed herein is a light emission system according to one or more examples of the present disclosure. A light emission system includes fixture assembly including a chassis and a driver board. The Chassis includes a plurality of modular optical receptacles. The driver board is removably coupled to the chassis. The system further includes a plurality of modular optical assemblies each configured to removably couple to the fixture assembly at the modular optical receptacles. The modular optical assemblies include a lens unit including a reflector, a focusing lens, and an annular ridge between the reflector and the focusing lens. The modular optical assemblies further include a support ring including an annular ring, and a plurality of axial protrusions extending from the annular ring. The modular optical assemblies further include a bezel ring. The support ring is disposed between the bezel ring and the lens unit. The preceding subject matter of this paragraph characterizes example 1 of the present disclosure.

The lens unit, the support ring and the bezel ring are collectively removable from the fixture assembly. The preceding subject matter of this paragraph characterizes example 2 of the present disclosure, wherein example 2 also includes the subject matter according to example 1, above.

The each axial protrusion includes a knob on a radially inwards side of the each axial protrusion. The preceding subject matter of this paragraph characterizes example 3 of the present disclosure, wherein example 3 also includes the subject matter according to any one of examples 1-2, above.

The reflector, the focusing lens, and the annular ridge of the lens unit are a unitary construction. The preceding subject matter of this paragraph characterizes example 4 of the present disclosure, wherein example 4 also includes the subject matter according to any one of examples 1-3, above.

The driver board including a plurality of drivers, wherein the chassis includes a central channel, and wherein the driver board extends through the central channel from a first end of the chassis to a second end of the chassis. The preceding subject matter of this paragraph characterizes example 5 of the present disclosure, wherein example 5 also includes the subject matter according to any one of examples 1-4, above.

The emitting each modular optical receptacle includes an angled centering chamfer at an outermost edge of the each modular optical receptacle. The preceding subject matter of this paragraph characterizes example 6 of the present disclosure, wherein example 6 also includes the subject matter according to any one of examples 1-5, above.

Each modular optical assembly further includes a sealing device, and wherein the sealing device interfaces with the angled centering chamfer at the outermost edge of the each modular optical receptacle. The preceding subject matter of this paragraph characterizes example 7 of the present disclosure, wherein example 7 also includes the subject matter according to any one of examples 1-6, above.

The bezel ring includes a pair of bayonet slots. The preceding subject matter of this paragraph characterizes example 8 of the present disclosure, wherein example 8 also includes the subject matter according to any one of examples 1-7, above.

Each modular optical receptacle includes a pair of bayonet pins. The preceding subject matter of this paragraph characterizes example 9 of the present disclosure, wherein example 9 also includes the subject matter according to any one of examples 1-8, above.

The lens unit, the support ring, and the bezel ring are coupled together by a radial interference fit. The preceding subject matter of this paragraph characterizes example 10 of the present disclosure, wherein example 10 also includes the subject matter according to any one of examples 1-9, above.

The support ring further includes an inner overhang at the annular ring. The preceding subject matter of this paragraph characterizes example 11 of the present disclosure, wherein example 11 also includes the subject matter according to any one of examples 1-10, above.

Each axial protrusion includes a knob on a radially inwards side of the each axial protrusion spaced from the inner overhang, forming a recess. The preceding subject matter of this paragraph characterizes example 12 of the present disclosure, wherein example 12 also includes the subject matter according to any one of examples 1-11, above.

The annular ridge interfaces with the recess. The preceding subject matter of this paragraph characterizes example 13 of the present disclosure, wherein example 13 also includes the subject matter according to examples 12, above.

The system further including a plurality of modular emitting devices. Each modular emitting device including a heat sink, an emitting implement, and an emitter board, wherein the emitter board is bonded to the heat sink. The preceding subject matter of this paragraph characterizes example 14 of the present disclosure, wherein example 14 also includes the subject matter according to any one of examples 1-13, above.

An apparatus includes a modular optical assembly collectively removable from a fixture assembly, the modular optical assembly including a lens unit including a reflector, a lens, and an annular ridge between the reflector and the focusing lens. The modular optical assembly further includes a support ring including, an annular ring, and a plurality of axial protrusions extending from the annular ring. The modular optical assembly further includes a bezel ring, wherein the support ring is disposed between the bezel ring and the lens unit. The preceding subject matter of this paragraph characterizes example 15 of the present disclosure.

The support ring further includes an inner overhang at the annular ring. Each axial protrusion includes a knob on a radially inwards side of the each axial protrusion spaced from the inner overhang, forming a recess. The annular ridge interfaces with the recess. The preceding subject matter of this paragraph characterizes example 16 of the present disclosure, wherein example 16 also includes the subject matter according to example 15, above.

The lens unit, the support ring, and the bezel ring are coupled together by a radial interference fit. The preceding subject matter of this paragraph characterizes example 17 of the present disclosure, wherein example 17 also includes the subject matter according to any one of examples 15-16, above.

The bezel ring includes a pair of bayonet slots and a plurality of evenly spaced wherein the bezel ring includes a pair of bayonet slots. The preceding subject matter of this paragraph characterizes example 18 of the present disclosure, wherein example 18 also includes the subject matter according to any one of examples 15-17, above.

The modular optical assembly further includes a sealing device disposed on an outer race of the bezel ring. The preceding subject matter of this paragraph characterizes example 19 of the present disclosure, wherein example 19 also includes the subject matter according to any one of examples 15-18, above.

The reflector, the focusing lens, and the annular ridge of the lens unit are a unitary construction, and wherein the lens unit is a focusing lens. The preceding subject matter of this paragraph characterizes example 20 of the present disclosure, wherein example 20 also includes the subject matter according to any one of examples 15-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

Illumination requirements for moving machinery are often changing based on the environment and properties of the machinery itself. Automotive lights, and even more particularly, automotive lights for racing are subjected to damaging conditions. Replacement of components sometimes needs to be done quickly and efficiently without having to replace expensive components that are still functioning. Embodiments described herein allow the modular replacement of components.

Figure 1:
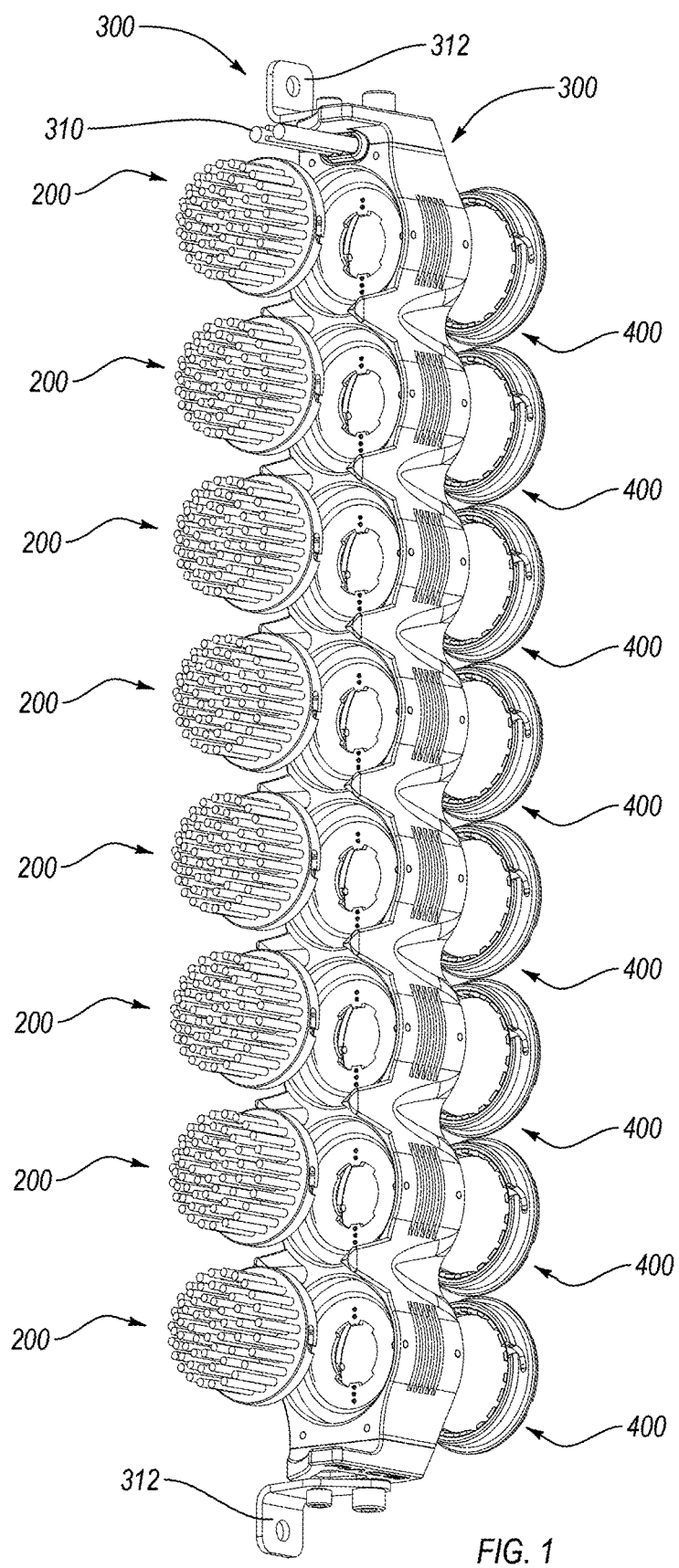
FIG. 1 is a rear perspective view of a light emission system in a partially exploded view, according to one or more embodiments of the present disclosure.

Referring to FIG. 1, a light emission system 100 is depicted in a rear perspective view. The light emission system 100 is depicted in a partially exploded view. The light emission system 100 includes a fixture assembly 300. The light emission system 100 further includes a plurality of modular emitting devices 200 that are configured to couple to the fixture assembly 300. The light emission system 100 further includes a plurality of modular optical assemblies 400 that are configured to couple to the fixture assembly 300. Although the light emission system 100 is shown and described with certain components and functionality, other embodiments of the light emission system 100 may include fewer or more components to implement less or more functionality.

The light emission system 100 includes a fixture assembly 300. The fixture assembly 300 is a fixture that is configured to permit coupling of modular emitting devices 200 and modular optical assemblies 400. The light emission system 100 FIG. 1 shows a plurality of modular emitting devices 200 in an exploded view, separated from the fixture assembly 300. The modular emitting devices 200 are configured to releasably couple to the fixture assembly 300 to permit the coupling and removal of modular emitting devices 200 when the modular emitting devices 200 wear down or break. In some instances, a user can swap out different modular emitting devices 200 that produce a different intensity of light, or a different color, or a different power usage, etc. The modular emitting devices 200 can be mixed and matched to suit the desires of the user.

The light emission system 100 FIG. 1 shows a plurality of modular optical assemblies 400 in an exploded view, separated from the fixture assembly 300. The modular optical assemblies 400 are configured to releasably couple to the fixture assembly 300 to permit the coupling and removal of modular optical assemblies 400 when the modular optical assemblies 400 wear down or break. In some instances, a user can swap out different modular optical assemblies 400 that produce a different focus or diffusion of light, or a different color lens, etc. The modular optical assemblies 400 can be mixed and matched to suit the desires of the user.

In some embodiments, the light emission system 100 is configured to attach to outdoor and/or off-road racing vehicles which may be subjected to harsh physical or chemical environments which can damage the modular optical assemblies 400. As the modular optical assemblies 400 are worn or damaged, easy replacement of the modular optical assemblies 400 is beneficial in racing environments where down time is critical. Although the light emission system 100 is described in conjunction with an off-road racing environment, it is contemplated that the light emission system 100 and the various components described herein may be utilized in more sterile and/or stationary environments. While the speed of replacement is not as critical in such environments, the modular components allow for the modular replacement of less expensive components without the need to replace more durable and more expensive components that are not subjected to the same wear and tear as the external modular components.

Figure 2:
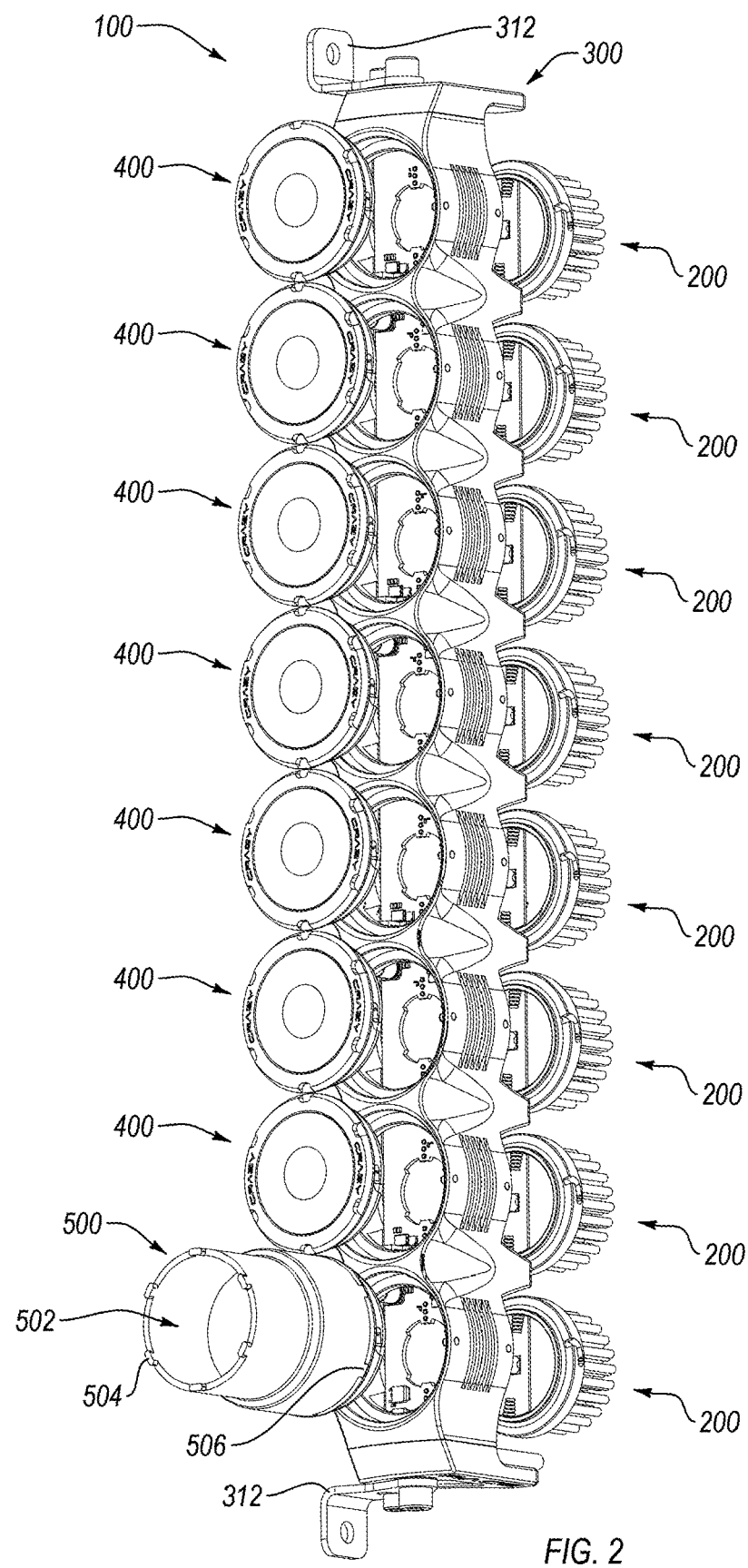
FIG. 2 is a front perspective view of a light emission system in a partially exploded view, according to one or more embodiments of the present disclosure.

The fixture assembly 300 includes eight modular emitter receptacles which are visible in FIG. 1. The modular emitter receptacles are configured to receive the modular emitting devices 200. Referring to FIG. 2, the fixture assembly 300 includes eight modular optical receptacles. The modular optical receptacles are configured to receive the modular optical assemblies 400. Although the light emission system 100 includes linear row of eight lights, the system 100 may include fewer or more lights and be arranged two or three dimensional arrays. As an example, in one embodiment, the light emission system 100 includes only one modular emitting device 200 and one modular optical assembly 400. In another embodiment, the light emission system 100 includes more than eight modular emitting devices 200 and more than eight modular optical assemblies 400.

In some embodiments, instead of a linear row (as depicted in FIG. 1), the light emission system 100 may include a two dimensional array of lights. For example, the lights may be arranged in a two by four array. Further, in some embodiments, the light emission system 100 may include a three dimensional array of lights. For example, instead of rows of lights being flush with one another, rows of lights may be set back or forward in relation to other rows of lights. As can be appreciated, a light emission system 100 may include a large number of lights. In such embodiments, the fixture assembly 300 represents a high cost component that is not as prone to wear or damage as the modular emitting devices 200 and the modular optical assemblies 400. As the light emission system 100 is damaged or worn over time, the modular components can be replaced with relative ease. In addition, the modular components may comprise cheaper subcomponents which are cheaper to replace.

In some embodiments, the modular emitting devices 200 are configured to be collectively removable from the fixture assembly 300. In other words, the modular emitting devices 200 are modular assembled units which are removable from the fixture assembly 300 as a single modular unit. As a modular assembled unit, the modular emitting device 200 is easily removed and replaced after wear and tear or damage occurs to the modular emitting device 200. In some embodiments, individual modular emitting devices 200 can be removed and replaced without damaging or interfering with the remaining modular emitting devices 200. That is, the remaining modular emitting devices 200 will continue to operate even with other modular emitting devices 200 removed from the system 100.

In some embodiments, the modular optical assemblies 400 are configured to be collectively removable from the fixture assembly 300. In other words, the modular optical assemblies 400 are modular assembled units which are removable from the fixture assembly 300 as a single modular unit. As a modular assembled unit, the modular optical assembly 400 is easily removed and replaced after wear and tear or damage occurs to the modular optical assembly 400.

In some embodiments, the fixture assembly 300 includes brackets 312. Referring to FIGS. 1 and 2, the fixture assembly 300 includes a pair of brackets 312 coupled at each end of the fixture assembly 300 which enable the fixture assembly 300 to be secured to another object. In some embodiments, the light emission system 100 may further include a mobile vehicle (not depicted) to which the fixture assembly 300 is attached by way of the pair of brackets 312. The fixture assembly 300 may be secured to any type of moving vehicle including, but not limited to, trucks, cars, vans, buses, all-terrain vehicles, boats, planes, etc. In addition, the fixture assembly 300 may be secured to stationary objects including, but not limited to, buildings, houses, garages, etc. Although brackets 312 are depicted, other fastening devices and system may be utilized to fasten or adhere the fixture assembly 300 to other objects.

The fixture assembly 300 further includes, in some embodiments, electrical connections 310. Referring to FIG. 1, the fixture assembly 300 includes electrical connections 310 which are depicted extending out from a rear of the fixture assembly 300. The electrical connections 310 may provide power. In some embodiments, the electrical connections 310 are connected to an external device and/or an external power source (such as a vehicle). In some embodiments, the electrical connections 310 are connected to an internal power source such as a battery. The electrical connections are electrically connected to the driver board (described in more detail below).

The electrical connection 310 may further be a communication interface in addition to a power interface. In some embodiments, the electrical connections 310 allow for communication from an external device to control the light emission system 100. As an example, the light emission may be controlled from a console in a vehicle. In some embodiments, a wireless communication interface communicates data and information to the driver board.

Figure 3:
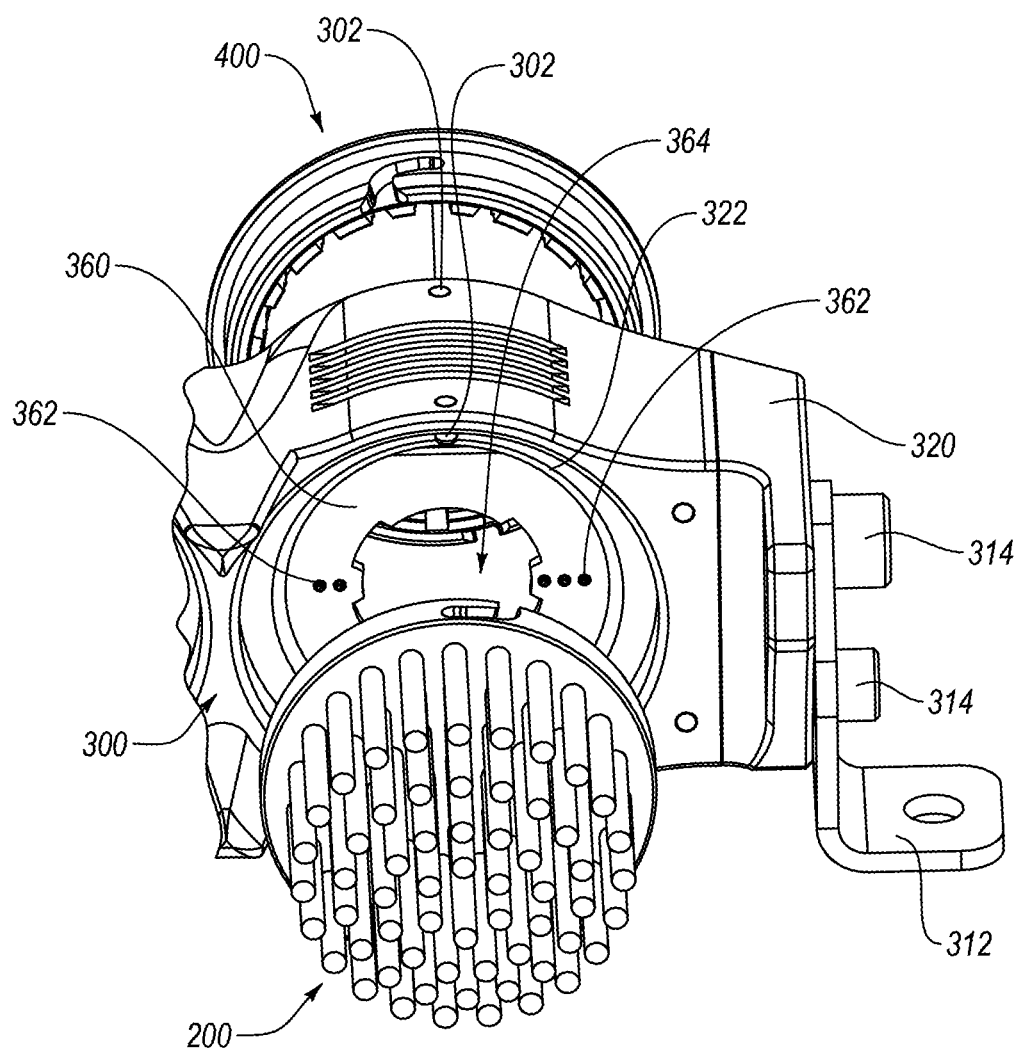
FIG. 3 is a detailed rear elevated view of a light emission system in a partially exploded view, according to one or more embodiments of the present disclosure.

Referring to FIG. 3, a detail view of light emission system 100 is shown. As shown, the light emission system 100 includes a fixture assembly 300 with a modular emitting device 200 and a modular optical assembly 400. The fixture assembly 300 includes a bracket 312 coupled to a chassis 320 by bolts 314. The chassis 320 is, in some embodiments, a monolithic unitary housing. In some embodiments, the chassis 320 is an assembled unitary housing. The chassis 320 may be made of any of a number of durable high strength materials. In some embodiments, the chassis 320 is a die cast housing that is heat sintered.

The chassis 320 houses a driver board 360 which extends through a central channel that extends from a first end of the chassis 320 to a second end of the chassis 320. The chassis 320 further includes modular emitter receptacles as shown in FIG. 3. The modular emitter receptacle is a female mechanical mating interface configured to receive and secure the modular emitting device 200. The modular emitter receptacle includes circular outer races into which the generally circular modular emitting device 200 fits.

The modular emitter receptacle includes an angled centering surface 322, which is a circular angled surface. The angled centering surface 322 is configured to interface with the sealing device 210 (see, for example, FIG. 12). When the modular emitting device 200 is coupled to the fixture assembly 300, the sealing device 210 is compressed between modular emitting device 200 and the angled centering surface 322. As the sealing device 210 seats on the angled centering surface 322, the modular emitting device 200 is centered. To provide optimal performance, misalignment between the modular emitting device 200 (and, more specifically, the emitting implement 256) and the modular optical assembly 400 is minimized.

Figure 12:
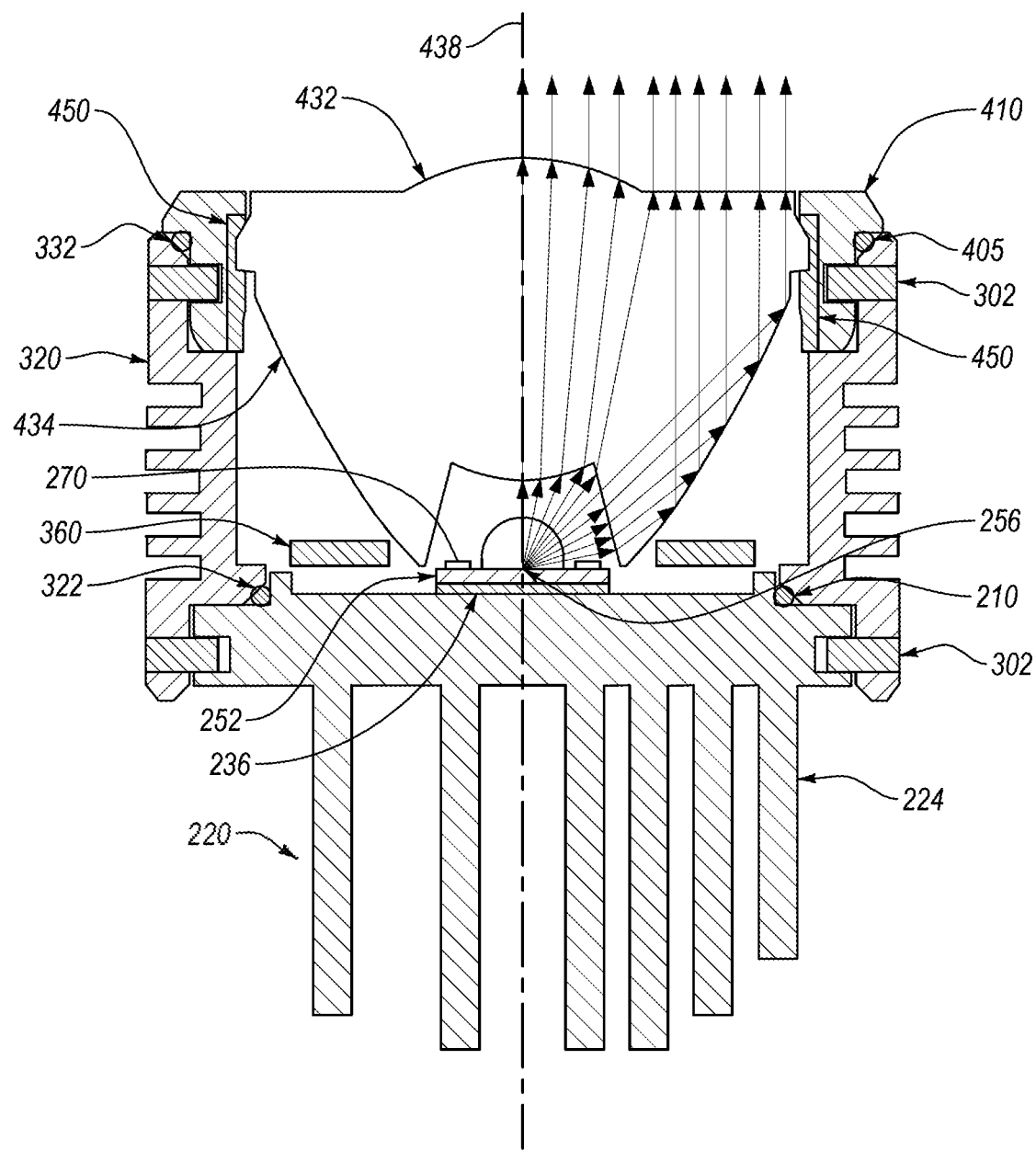
FIG. 12 is a cross-sectional view of a light emission system, according to one or more embodiments of the present disclosure.

In some embodiments, the angled centering surface 322 is a forty-five degree angled surface (as depicted in FIG. 12). In some embodiments, the angled centering surface 322 is a sixty degree angled surface. In some embodiments, angled centering surface 322 is a thirty degree angled surface. Regardless of the angle, the angled centering surface 322 provides a radial seal and not just an axial seal.

The angled centering surface 322 in conjunction with the sealing device 210 and the modular emitting device 200 cooperatively self align the modular emitting device 200 in a repeatable centered position, allowing for quick removal and replacement of the modular emitting device 200. As an example, embodiments described herein reduce misalignment to fifty microns or less. It is noted that lighting systems with modular bulbs don't misalign as the bulb is an assembled unit. With modular components misalignment may be a larger problem.

In addition, the sealing device 210 further seals and/or isolates the driver board 360 from the external environment. The isolation of the internal components of the fixture assembly 300 increases the life of the internal components allowing for minimal replacement of expensive internal components.

Referring again to FIG. 3, the fixture assembly 300 includes in the modular emitter receptacle a pair of pins or bayonet pins 302 (only the upper bayonet pin 302 is visible in the modular emitter receptacle as the lower bayonet pin 302 is obscured by the modular emitting device 200). The bayonet pin 302 is a stainless steel pin extending into the cavity of the modular emitter receptacle. Other materials are contemplated to be within the scope of embodiments described herein. In the illustrated embodiment, each modular emitter receptacle includes a pair of bayonet pins 302 positioned at one hundred and eighty degrees from one another. The bayonet pins 302 are configured to interface with bayonet slots on the modular emitting device 200.

Because the bayonet pins 302 are constructed, in some embodiments, in stainless steel (or another high strength and durable material) the modular emitting devices 200 are locked in place (a feature of great benefit for embodiments of the light emission system 100 that are utilized on off-road vehicles). In addition, a high strength and durable material allows for an increased torque pressure as the bayonet pins 302 are engaged in the bayonet slots.

Referring again to FIG. 3, the driver board 360 includes a driver board aperture 364. The emitting implement 256 on the modular emitting device 200 is configured to be exposed through the driver board aperture 364.

The driver board 360 further includes a plurality of spring loaded pins 362. The spring loaded pins 362 are located on each side of the driver board aperture 364. In the illustrated embodiment, the driver board 360 includes two spring loaded pins 362 on the left side of the driver board aperture 364 and three spring loaded pins 362 on the right side of the driver board aperture 364. The spring loaded pins 362 are configured to interface with the modular emitting device 200 and, more specifically, the landing pads of the emitter board 252.

Traditional lights (such as LED lights) have one electrical circuit for the light. It is not practical or easy to replace individual components or individual subcomponents of the electrical circuit of a light (the electrical circuit is sometimes referred to as the driver). When any subcomponent fails, the light is replaced including expensive subcomponents that are still functioning would last much more time in use.

Embodiments described herein effectively split the electrical circuit between the driver board 360 and the emitter board 252 allowing for a modularly separated electrical circuit. The emitter board 252 and the driver board 360 communicated to each other through the landing pads of the emitter board 252 and the spring loaded pins 362 of the driver board 360.

In some embodiments, the alignment of the bayonet pins 302, bayonet slots, landing pads, and spring load pins 362 allow for one-hundred and eighty degree compatibility. That is, with two bayonet slots and two bayonet pins 302, the modular emitting device 200 can be inserted in either of two orientations. However, in some embodiments, the landing pads and the spring loaded pins 362 are configured to interface regardless of which of the two orientations is selected. This allows for quick replacement of the modular emitting device 200 without the user needing to worry about a correct orientation. This occurs by having these subcomponents (the bayonet pins 302, bayonet slots, landing pads, and spring load pins 362) at one-hundred and eighty degree increments.

Figure 4:
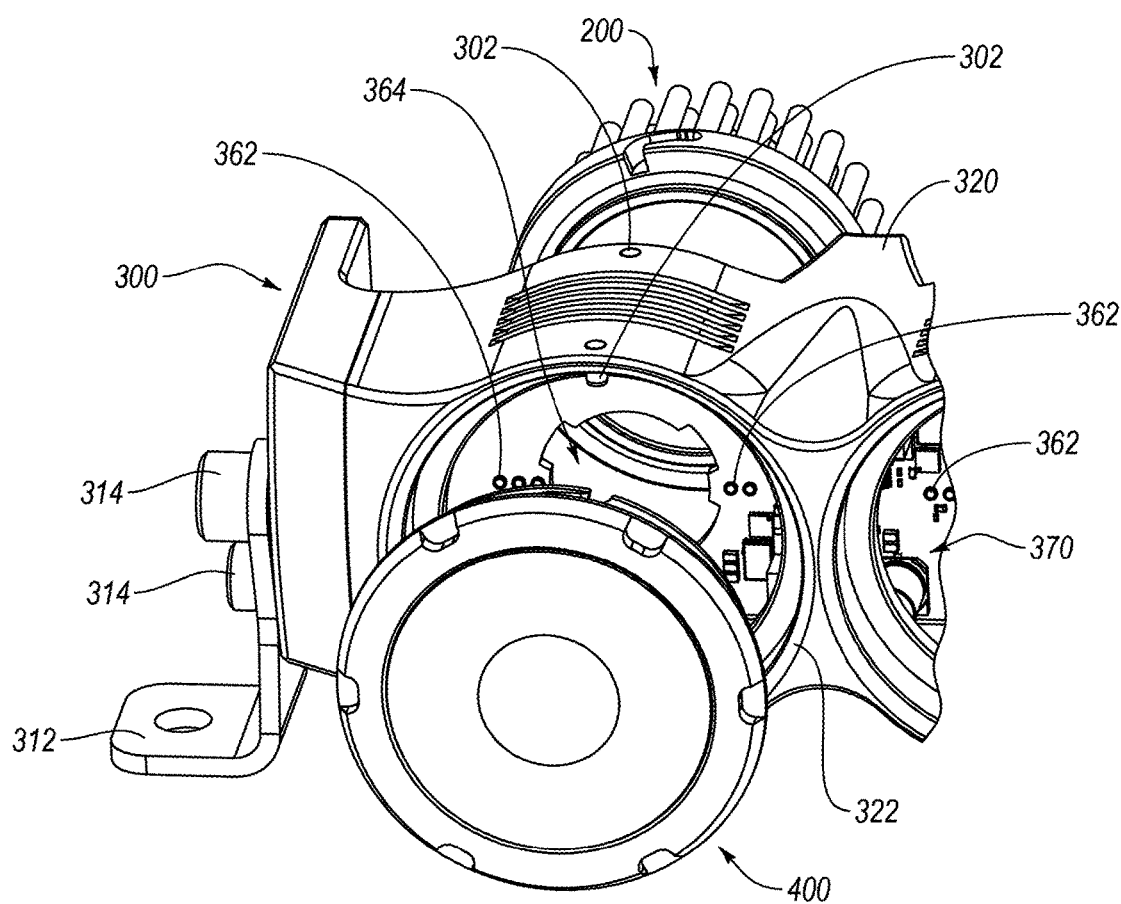
FIG. 4 is a detailed front elevated view of a light emission system in a partially exploded view, according to one or more embodiments of the present disclosure.

Referring now to FIG. 4, a front detail view of a light emission system 100 is shown. As depicted in this view, the chassis 320 further includes modular optical receptacles. The modular optical receptacle is a female mechanical mating interface configured to receive and secure the modular optical assembly 400. The modular optical receptacle includes circular outer races into which the generally circular modular optical assembly 400 fits.

The modular optical receptacle includes an angled centering chamfer 332, which is a circular angled surface. The angled centering chamfer 332 is configured to interface with the sealing device 405 (see, for example, FIG. 12). When the modular optical assembly 400 is coupled to the fixture assembly 300, the sealing device 405 is compressed between modular optical assembly 400 and the angled centering chamfer 332. As the sealing device 405 seats on the angled centering chamfer 332, the modular optical assembly 400 is centered. To provide optimal performance, misalignment between the modular emitting device 200 (and, more specifically, the emitting implement 256) and the modular optical assembly 400 is minimized.

In some embodiments, the angled centering chamfer 332 is a forty-five degree angled surface (as depicted in FIG. 12). In some embodiments, the angled centering chamfer 332 is a sixty degree angled surface. In some embodiments, angled centering chamfer 332 is a thirty degree angled surface. Regardless of the angle, the angled centering chamfer 332 provides a radially seal and not just an axial seal.

The angled centering chamfer 332 in conjunction with the sealing device 405 and the modular optical assembly 400 cooperatively self-align the modular optical assembly 400 in a repeatable centered position, allowing for quick removal and replacement of the modular optical assembly 400. As an example, embodiments described herein reduce misalignment to fifty microns or less. It is noted that lighting systems with modular bulbs don't misalign as the bulb is an assembled unit. With modular components misalignment may be a larger problem and the self-alignment allows for quicker and easier replacement of components.

In addition, the sealing device 405 further seals and/or isolates the driver board 360 from the external environment. The isolation of the internal components of the fixture assembly 300 increases the life of the internal components allowing for minimal replacement of expensive internal components.

Referring again to FIG. 4, the fixture assembly 300 includes, extending into the modular optical receptacle, a pair of pins or bayonet pins 302 (only the upper bayonet pin 302 is visible in the modular optical receptacle as the lower bayonet pin 302 is obscured by the modular optical assembly 400). The bayonet pin 302 is a stainless steel pin extending into the cavity of the modular optical receptacle. Other materials are contemplated to be within the scope of embodiments described herein. In the illustrated embodiment, each modular optical receptacle includes a pair of bayonet pins 302 positioned at one hundred and eighty degrees from one another. The bayonet pins 302 are configured to interface with bayonet slots on the modular emitting device 200.

Because the bayonet pins 302 are constructed, in some embodiments, in stainless steel (or another high strength and durable material) the modular optical assembly 400 are locked in place (a feature of great benefit for embodiments of the light emission system 100 that are utilized on off-road vehicles). In addition, a high strength and durable material allows for an increased torque pressure as the bayonet pins 302 are engaged in the bayonet slots.

Also depicted (at least partially) in FIG. 4 is a driver circuit or driver 370. The driver 370 is a circuit that regulates the power to the emitting implement 256 and responds to the changing needs of the emitting implement 256. Using a light emitting diode (LED) as an example, as the LED heats up, the driver 370 is able to respond to the changing needs of the LED by maintaining a constant power level. Without a proper driver 370 the LED may become too hot and unstable, causing failure or poor performance.

Figure 5:
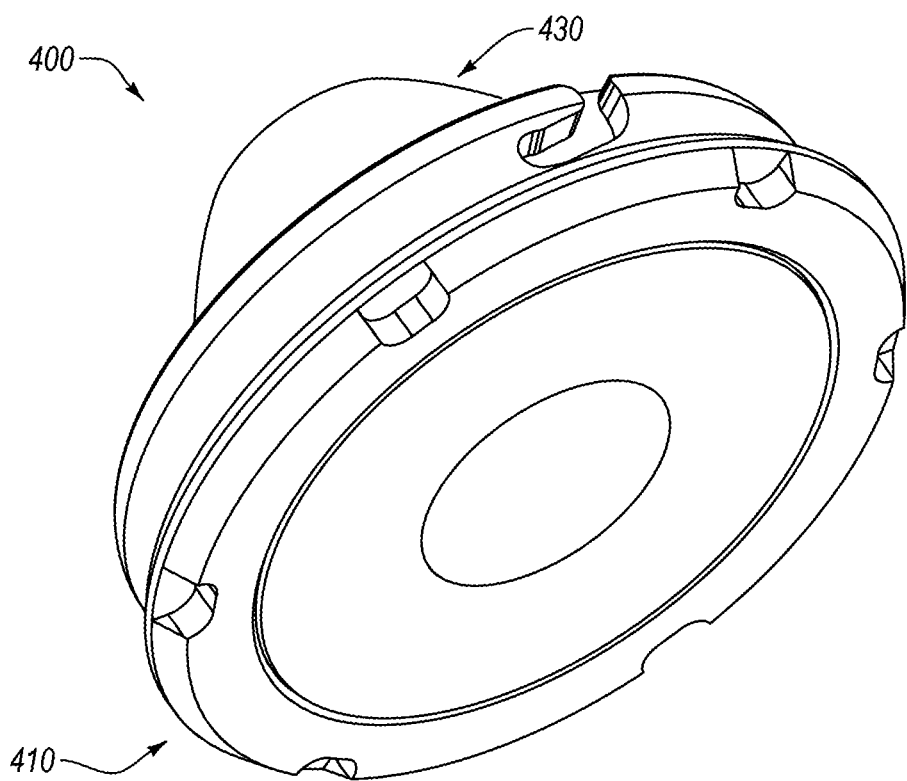
FIG. 5 is a perspective view of a modular optical assembly, according to one or more embodiments of the present disclosure.

Referring now to FIG. 5, a perspective view of a modular optical assembly 400 is shown. The modular optical assembly 400 includes a bezel ring 410, a lens unit 430, and a support ring 450 (not visible in FIG. 5). Although the modular optical assembly 400 is shown and described with certain components and functionality, other embodiments of the modular optical assembly 400 may include fewer or more components to implement less or more functionality.

The modular optical assembly 400 is a modular assembled unit. In some embodiments, the lens unit 430, the support ring 450, and the bezel ring 410 are coupled together by a radial interference fit. In some embodiments, the lens unit 430, the support ring 450, and the bezel ring 410 are collectively removable from the fixture assembly 300 or collectively couplable to the fixture assembly 300 at a modular optical receptacle.

Figure 6:
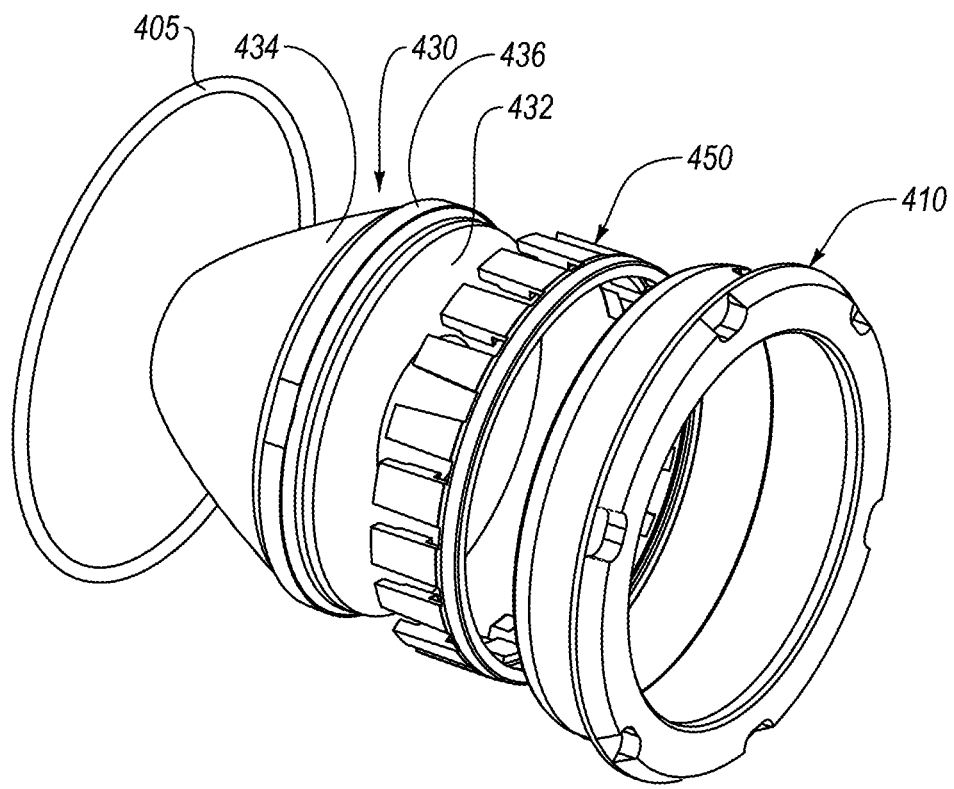
FIG. 6 is an exploded perspective view of a modular optical assembly, according to one or more embodiments of the present disclosure.

Referring to FIG. 6, an exploded perspective view of a modular optical assembly 400 is shown. The modular optical assembly 400 includes a sealing device 405, a bezel ring 410, a support ring 450, and a lens unit 430. The sealing device 405 may be an O-ring or other annular shaped sealing apparatus. The sealing device 405 may be made of an elastomeric material, or a thermoplastic or thermoset material. The sealing device 405 surrounds the outer race 424 of the bezel ring and is seated up against the outer ledge face 422, which is perpendicular to the outer race 424.

The modular optical assembly 400 further includes a lens unit 430. The lens unit 430 includes a reflector 434 configured to reflect light and redirect light to a lens 432. The reflector 434 is a cone shaped surface that extends from a more narrow circular edge to a wider circular edge. As light is diffused in all directions after moving through the optic, the reflector 434 redirects light to the lens 432. The reflector 434 ends at the annular ridge 436 which is a protuberance that is the outermost radial extent of the lens unit 430. Opposite the reflector 434 is the lens 432. In some embodiments, the lens 432 is a focusing lens 432. Although described and depicted as a focusing lens, the lens unit may, in other embodiments diffuse light in all direction. The lens 432 is configured to focus light and produce a focused columnar light 438 (see FIG. 12).

In some embodiments, the reflector 434, the annular ridge 436, and the lens 432 are a unitary construction. In some embodiments, the reflector 434, the annular ridge 436, and the lens 432 may be assembled components that are removably coupled to one another.

Figure 7:
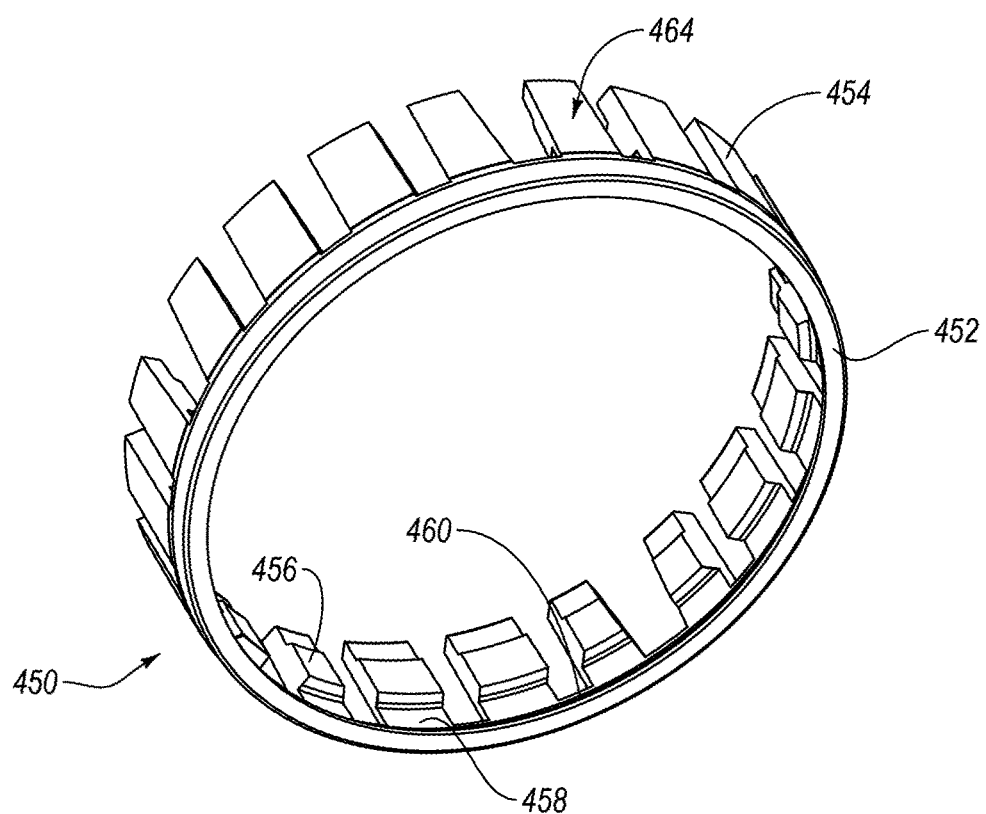
FIG. 7 is a perspective view of a support ring, according to one or more embodiments of the present disclosure.

The modular optical assembly 400 further includes a support ring 450. The support ring 450 is a retaining ring, in some embodiments, that is configured to retain the lens unit 430 with the bezel ring 410. The support ring 450 includes an annular ring 452 (See, for example, FIG. 7) with a plurality of axial protrusions 454 extending out from the annular ring 452 in an axial direction. The axial protrusions 454 are rectangular projections which extend in a rearward direction when the modular optical assembly 400 is assembled. The support ring 450, in some embodiments, includes an inner overhang 460 forming a lip. The plurality of axial protrusions 454 extend around the annular ring 452. In some embodiments, the axial protrusions 454 are spaced equally around the annular ring 452. In some embodiments, the axial protrusions 454 are not spaced equally around the annular ring 452. In some embodiments, the axial protrusions 454 are all the same size and shape. In some embodiments, the axial protrusions 454 are different sizes.

The axial protrusions 454 each include a knob 456 on the radially inwards side of the axial protrusions 454. The knob 456 is a rectangular protuberance. The knobs 456 may vary in shape and size. Formed between the inner overhang 460 and the knobs 456 on each axial protrusion 454 is a recess 458 which is a trough or slough into which the annular ridge 436 interfaces. The knobs 456 stabilize the lens unit 430 to better retain the lens unit 430 in the bezel ring 410.

Figure 8:
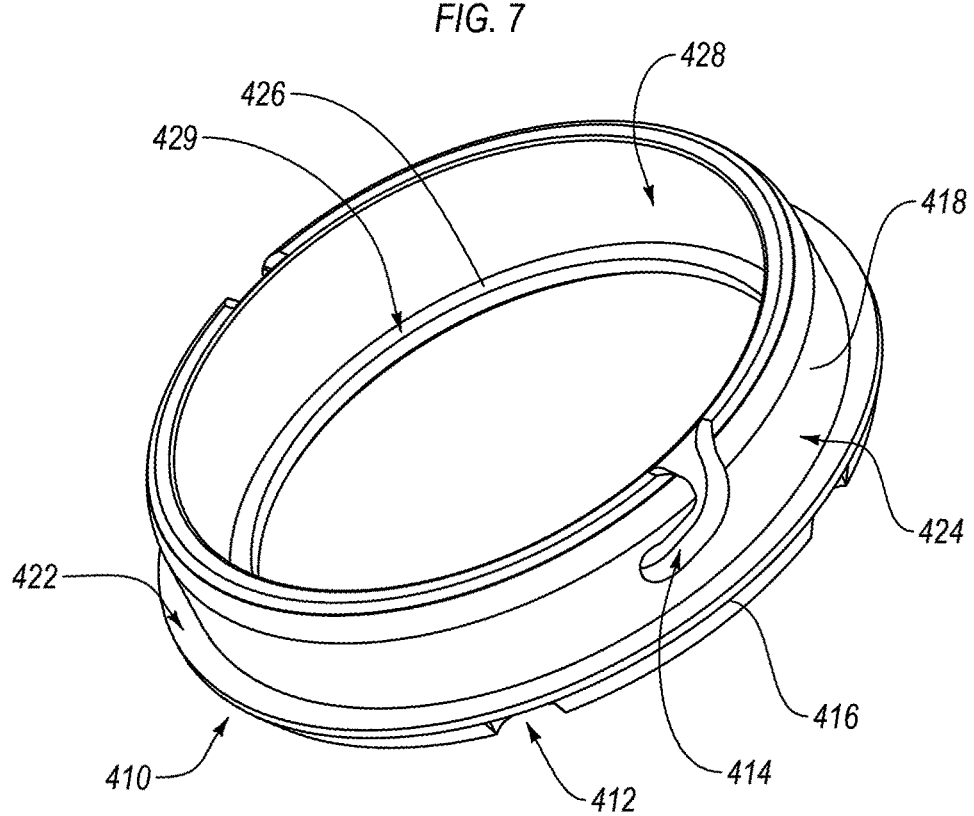
FIG. 8 is a rear view of a bezel ring, according to one or more embodiments of the present disclosure.
Figure 9:
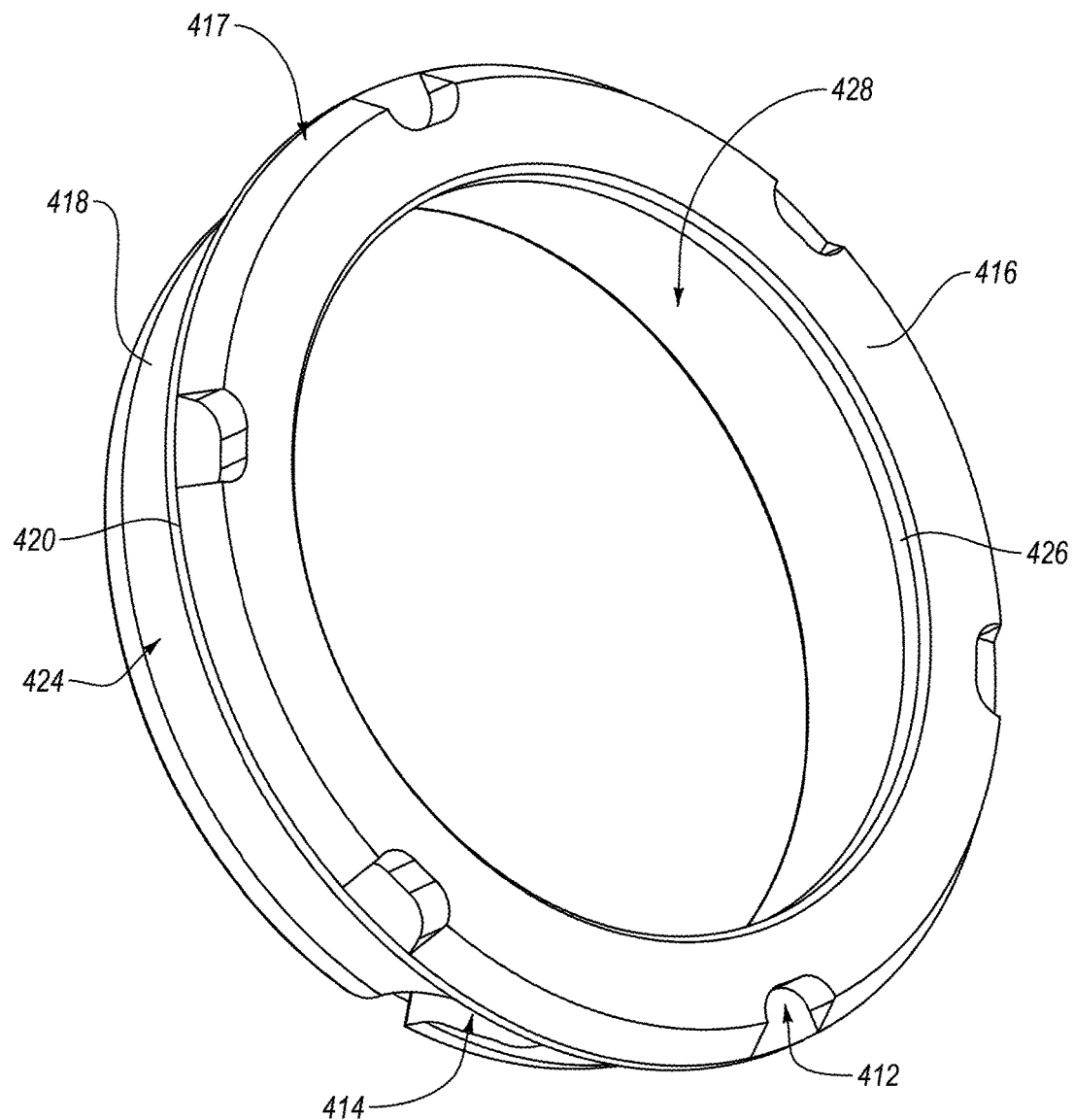
FIG. 9 is a front view of bezel ring, according to one or more embodiments of the present disclosure.

The modular optical assembly 400 further includes a bezel ring 410 (see, for example, FIGS. 8 and 9). The bezel ring 410 includes a hollow cylindrical ring 418 that defines an outer race 424 and an inner race 428. The outer race 424 interfaces with the sealing device 405. The inner race 428 interfaces with the support ring 450 and more specifically the outer surface 464 of the axial protrusions 454.

The hollow cylindrical ring 418 of the bezel ring 410 includes a pair of bayonet slots 414 on the outer race 424. The bayonet slot 414 is an L-shaped or J-shaped curved slot that allows the modular optical assembly 400 to be inserted into the modular optical receptacle and twisted slightly to secure the modular optical assembly 400 to the fixture assembly 300.

At a first end of the hollow cylindrical ring 418, the bezel ring 410 includes a projected outer ledge 420 which extends radially outwards to form the outer ledge face 422. The outer ledge face 422 is configured to seat the sealing device 405 when the modular optical assembly 400 is coupled to the fixture assembly. The bezel ring 410 further includes a projected inner ledge 426 which extends radially inwards to form the inner ledge face 429. The inner ledge face is configured to interface with the support ring 450 to restrict axial movement of the support ring 450.

In some embodiments, the bezel ring 410 further includes notches 412 on the front side of the projected outer ledge 420. The illustrated embodiment depicts six notches 412 on the bezel ring 410. The notches 412 may interface with a socket tool 500 (see FIG. 2) and more specifically with the protrusions 506. The socket tool 500 is an annular elongated tool with plurality of oblong projections 504 on a first end of the socket tool 500 and a plurality of protrusions 506 on a second end of the socket tool 500 surrounding an opening 502. The oblong projections 504 or the protrusions 506 may be inserted into the indentation 238 or the notches 412 on the modular optical assembly 400, respectfully. Also on the face of the bezel ring 410 are bevel surfaces 416 which are angled surfaces around the outermost portion of the bezel ring 410.

Referring again to FIG. 6, the modular optical assembly 400 includes a sealing device 405. The sealing device 405 may be an O-ring or other sealing apparatus. The sealing device 405 is seated on the outer ledge face 422 and the outer race 424. As discussed previously, the sealing device 405, in conjunction with the angled centering chamfer 332, self-align the modular optical assembly 400 and provide a radial seal.

Figure 10:
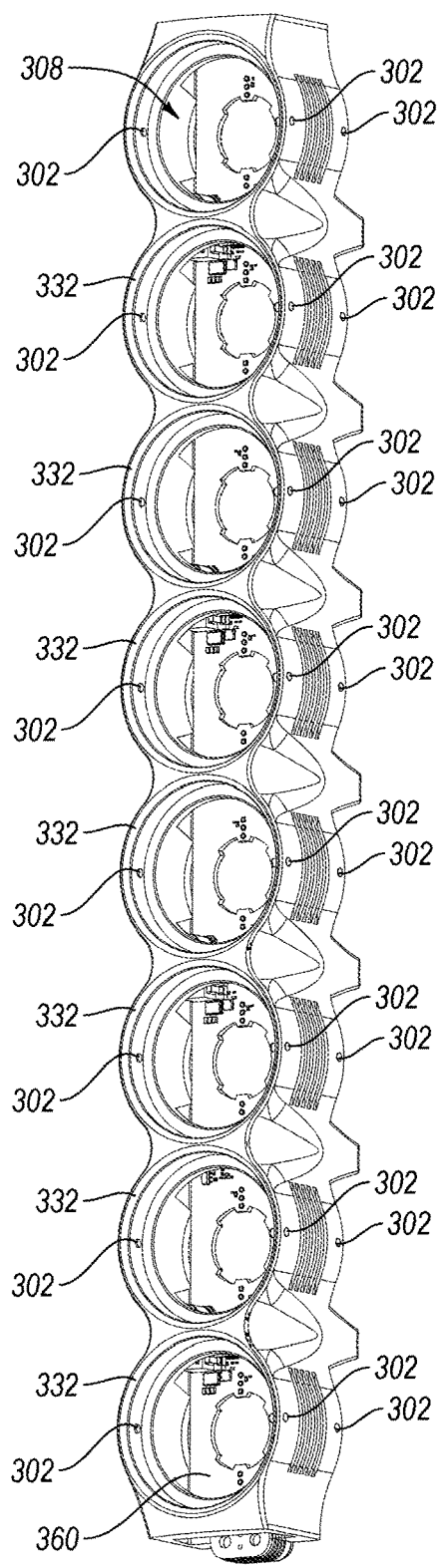
FIG. 10 is a perspective view of a housing apparatus, according to one or more embodiments of the present disclosure.
Figure 11:
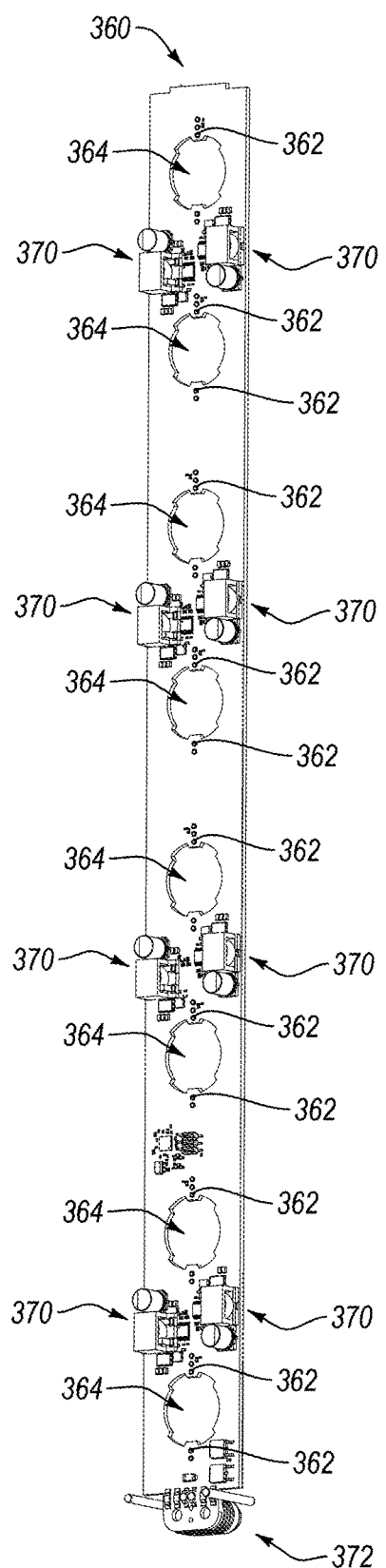
FIG. 11 is a perspective view of a driver board, according to one or more embodiments of the present disclosure.

Referring to FIG. 10, an embodiment of a fixture assembly 300 is shown. The fixture assembly 300 includes a chassis 320 and a driver board 360. The chassis 320 includes eight modular optical receptacles 308 configured to receive the modular optical assemblies 400. The driver board 360 is an elongated circuit board or printed circuit board (see FIG. 11) that extends through a central channel of the chassis 320. The driver board includes a plurality of driver board apertures 364 and a plurality of drivers 370. The driver board apertures 364 and the drivers 370 each correspond to modular emitting device 200. The driver board 360 further includes a power circuit 372 which is configured to distribute power and communication to each of the individual drivers 370.

Referring to FIG. 12, a cross-sectional view of an assembled light emission system 100 is shown. In the illustrated embodiment, the light emission system 100 includes a modular emitting device 200 which is coupled to the fixture assembly 300. In addition, the light emission system 100 includes a modular optical assembly 400 coupled to the fixture assembly 300.

The modular emitting device 200 includes many of the features discussed above which are not repeated for the sake of brevity. The illustrated embodiment depicts a thermal interface 236 between the emitter board 252 and the heat sink 220 including a plurality of projections 224. The thermal interface 236 may be a thermal medium such as a thermal grease or a thermal pad or another thermally conductive material. In some embodiments, the emitter board 252 includes a temperature sensor 270 which is configured to sense the temperature of the emitter board 252.

The illustrated embodiment includes a depiction of the focused columnar light 438 that is produced from the modular emitting device 200 and out the modular optical assembly 400. The modular optical assembly 400 includes bezel ring 410, a support ring 450, a lens unit 430, and a sealing device 405. Light is generated at an emitting implement 256 and diffused through a primary optic. The light is then distributed into the lens unit 430, in which some light is reflected off a reflector 434 and redirected through a lens 432 which focuses the light into a focused columnar light 438.

As depicted the bezel ring 410 and the sealing device 405 form a seal against an angled centering chamfer 332 on the chassis 320. Pressed between the bezel ring 410 and the lens unit 430 is the support ring 450. The support ring 450 includes various knobs which are configured to interface with a ridge on the lens unit which allows the support ring 450 to retain the lens unit 430 in the modular optical assembly 400.

Many LED lights include a plurality of emitters 256, however, in some embodiments described herein, the modular emitting devices 200 include only a single emitting implement 256 which is then focused by the lens unit 430, not diffused as many lens are built to do. Some embodiments described herein are utilized in off-road racing, which has demanding specifications and which incur frequent damage or wear and tear. Embodiments described herein allow for modular components to be separated and easily replaced without the need to replace durable, expensive components.

It is noted that the modular emitting devices 200 can be replaced separately from the modular optical assemblies 400 and vice versa without the need to replace the corresponding modular units. The flexibility allows for replacement of only modular units that the user wants to replace without interfering with the other modular units.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A light emission system, the system comprising:
   a fixture assembly comprising:
      a chassis comprising a plurality of modular optical receptacles; and
      a driver board removably coupled to the chassis; and
   a plurality of modular optical assemblies each configured to removably couple to the fixture assembly at the modular optical receptacles, each modular optical assembly comprising:
      a lens unit comprising:
         a reflector;
         a focusing lens; and
         an annular ridge between the reflector and the focusing lens;
      a support ring comprising:
         an annular ring;
         a plurality of axial protrusions extending from the annular ring; and
      a bezel ring, wherein the support ring is disposed between the bezel ring and the lens unit.

2. The system of claim 1, wherein the lens unit, the support ring and the bezel ring are collectively removable from the fixture assembly.

3. The system of claim 1, wherein each axial protrusion comprises a knob on a radially inwards side of the each axial protrusion.

4. The system of claim 1, wherein the reflector, the focusing lens, and the annular ridge of the lens unit are a unitary construction.

5. The system of claim 1, the driver board comprising a plurality of drivers, wherein the chassis comprises a central channel, and wherein the driver board extends through the central channel from a first end of the chassis to a second end of the chassis.

6. The system of claim 1, wherein each modular optical receptacle includes an angled centering chamfer at an outermost edge of the each modular optical receptacle.

7. The system of claim 6, wherein each modular optical assembly further comprises a sealing device, and wherein the sealing device interfaces with the angled centering chamfer at the outermost edge of the each modular optical receptacle.

8. The system of claim 1, wherein the bezel ring comprises a pair of bayonet slots.

9. The system of claim 8, wherein each modular optical receptacle includes a pair of bayonet pins.

10. The system of claim 1, wherein the lens unit, the support ring, and the bezel ring are coupled together by a radial interference fit.

11. The system of claim 1, wherein the support ring further comprises an inner overhang at the annular ring.

12. The system of claim 11, wherein each axial protrusion comprises a knob on a radially inwards side of the each axial protrusion spaced from the inner overhang, forming a recess.

13. The system of claim 12, wherein the annular ridge interfaces with the recess.

14. The system of claim 1, further comprising a plurality of modular emitting devices each configured to removably couple to the fixture assembly, each modular emitting device comprising:
   a heat sink;
   an emitting implement; and
   an emitter board, wherein the emitter board is bonded to the heat sink.

15. An apparatus comprising:
   a modular optical assembly collectively removable from a fixture assembly, the modular optical assembly comprising:
      a lens unit comprising a reflector, a lens, and an annular ridge between the reflector and the lens;
      a support ring comprising an annular ring, and a plurality of axial protrusions extending from the annular ring; and
      a bezel ring, wherein the support ring is disposed between the bezel ring and the lens unit, wherein the bezel ring comprises a plurality of bayonet slots.

16. The apparatus of claim 15, wherein:
   the support ring further comprises an inner overhang at the annular ring;
   each axial protrusion comprises a knob on a radially inwards side of the each axial protrusion spaced from the inner overhang, forming a recess; and
   the annular ridge interfaces with the recess.

17. The apparatus of claim 15, wherein the lens unit, the support ring, and the bezel ring are coupled together by a radial interference fit.

18. The apparatus of claim 15, wherein the modular optical assembly further comprises a sealing device disposed on an outer race of the bezel ring.

19. The apparatus of claim 15, wherein the reflector, the lens, and the annular ridge of the lens unit are a unitary construction, and wherein the lens unit is a focusing lens.

* * * * *